Figure 13:
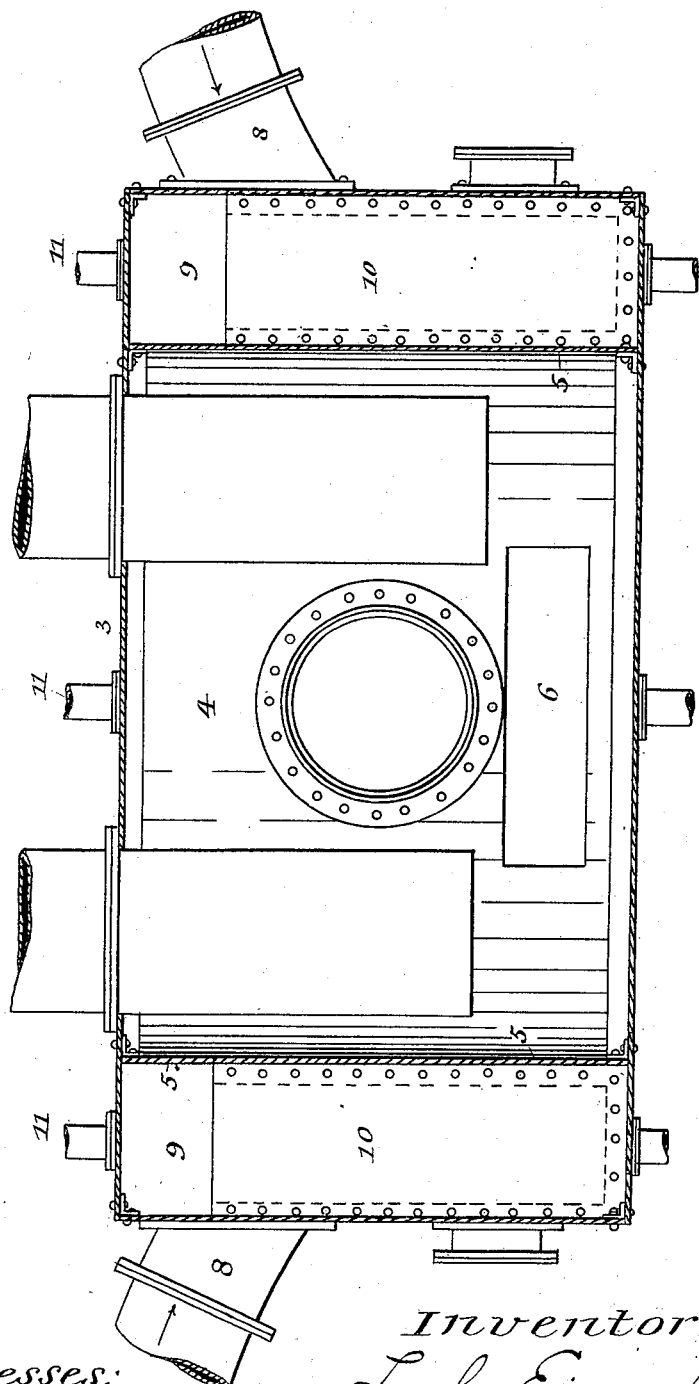

No. 665,076. Patented Jan. 1, 1901.
L. C. EISENHUT.
SYSTEM OF COLLECTING WATER FROM WELLS.
(Application filed Jan. 19, 1899.)
(No Model.) 10 Sheets—Sheet 1.
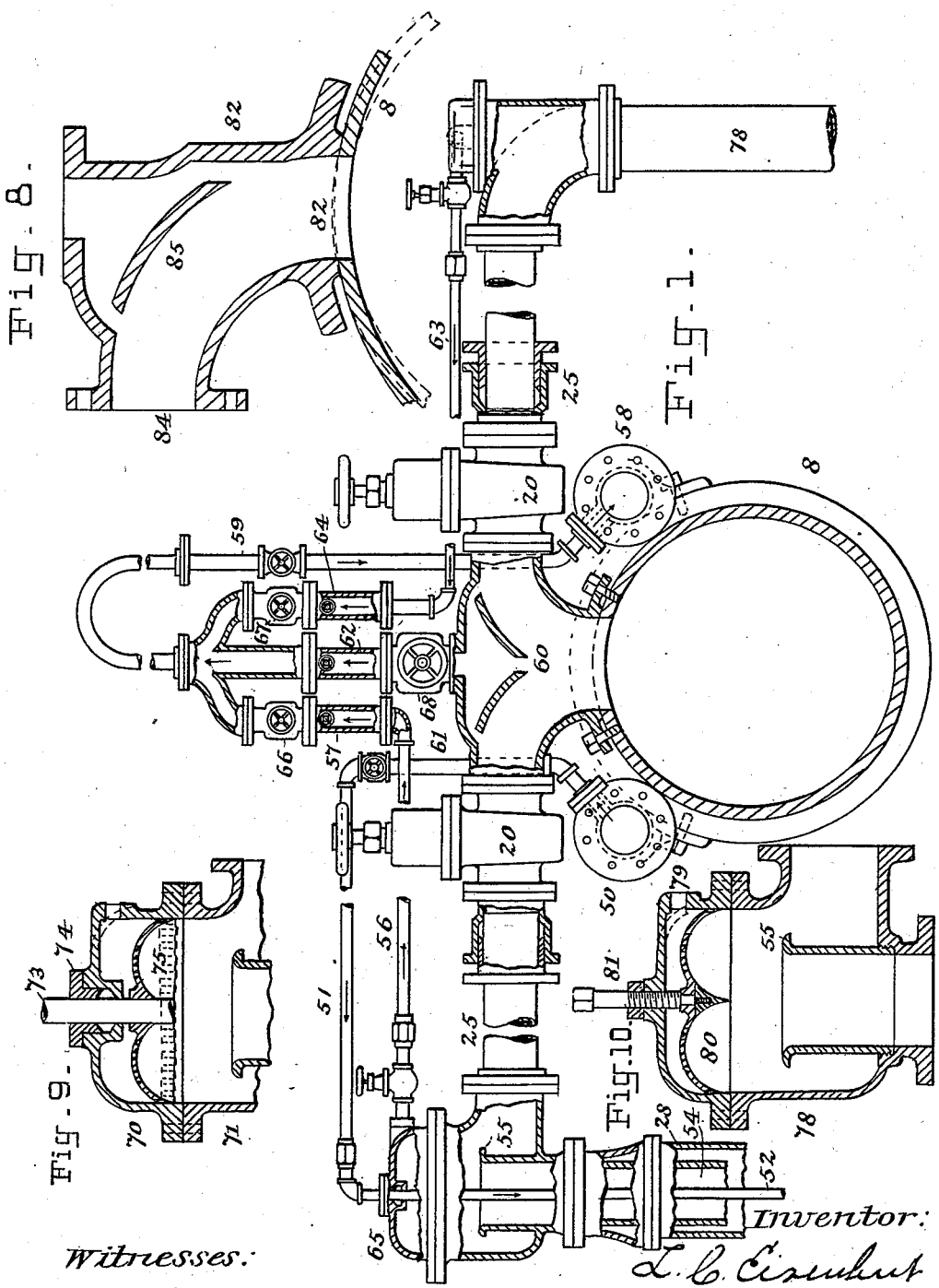
Witnesses:
E. B. Bolton
M. L. Shay
Inventor:
L. C. Eisenhut
By Charles L. Rogers
his Attorney.

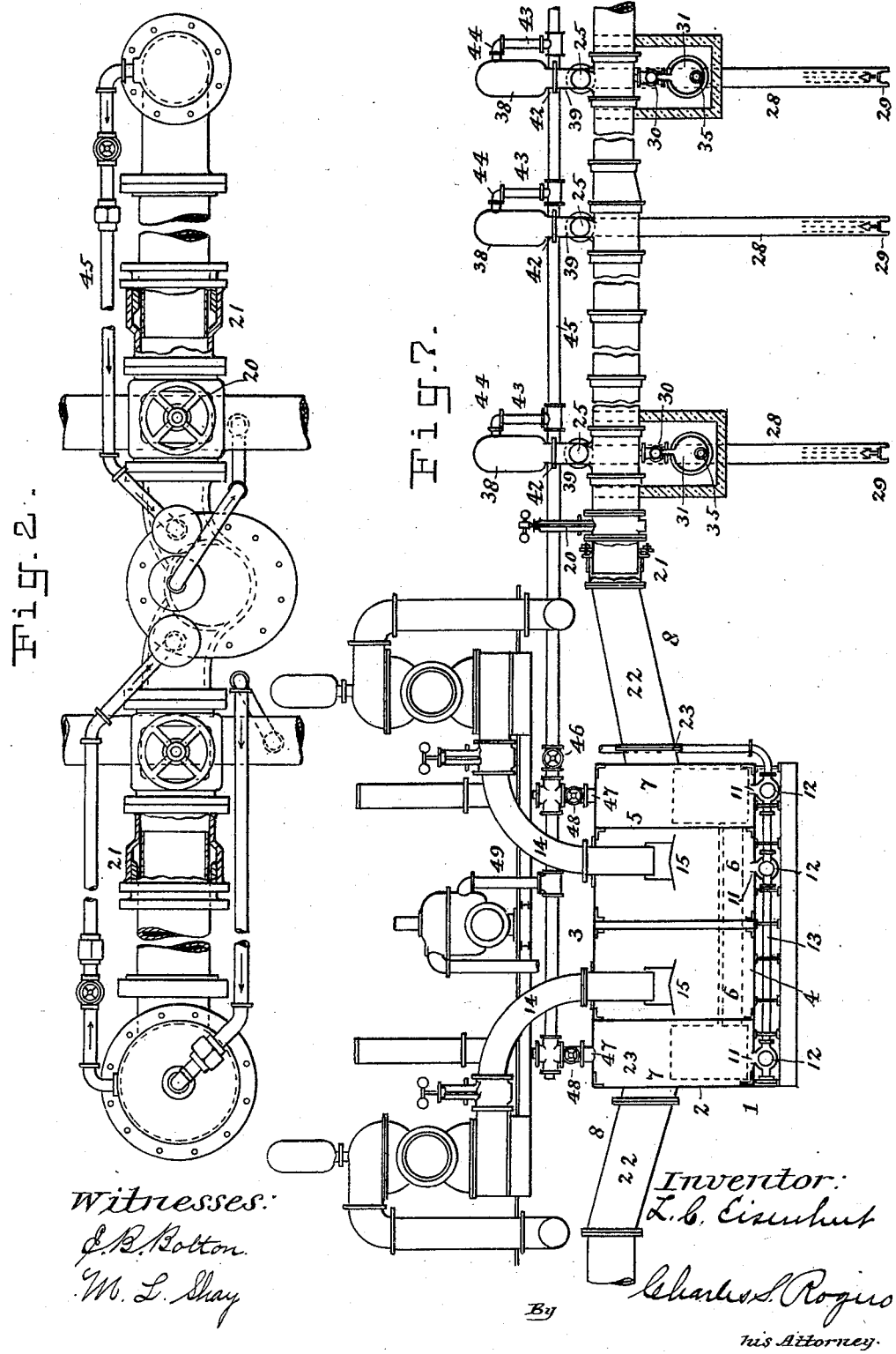

No. 665,076. Patented Jan. 1, 1901.
L. C. EISENHUT.
SYSTEM OF COLLECTING WATER FROM WELLS.
(Application filed Jan. 19, 1899.)
(No Model.) 10 Sheets—Sheet 3.
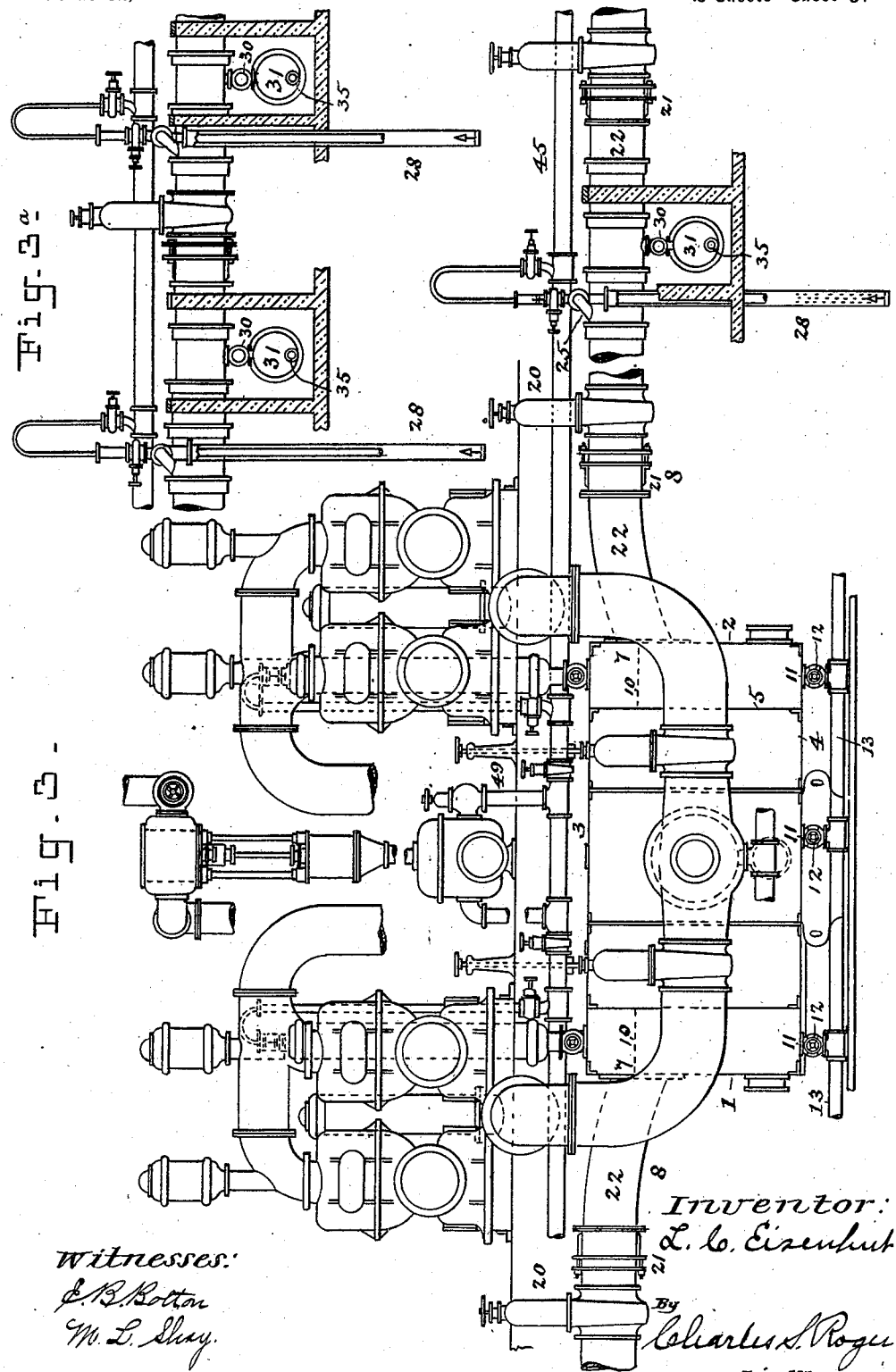
Witnesses:
E. B. Bolton
M. L. Shay
Inventor:
L. C. Eisenhut
By Charles S. Rogers
his Attorney No. 665,076. Patented Jan. 1, 1901.
L. C. EISENHUT.
SYSTEM OF COLLECTING WATER FROM WELLS.
(Application filed Jan. 19, 1899.)
(No Model.) 10 Sheets—Sheet 4.
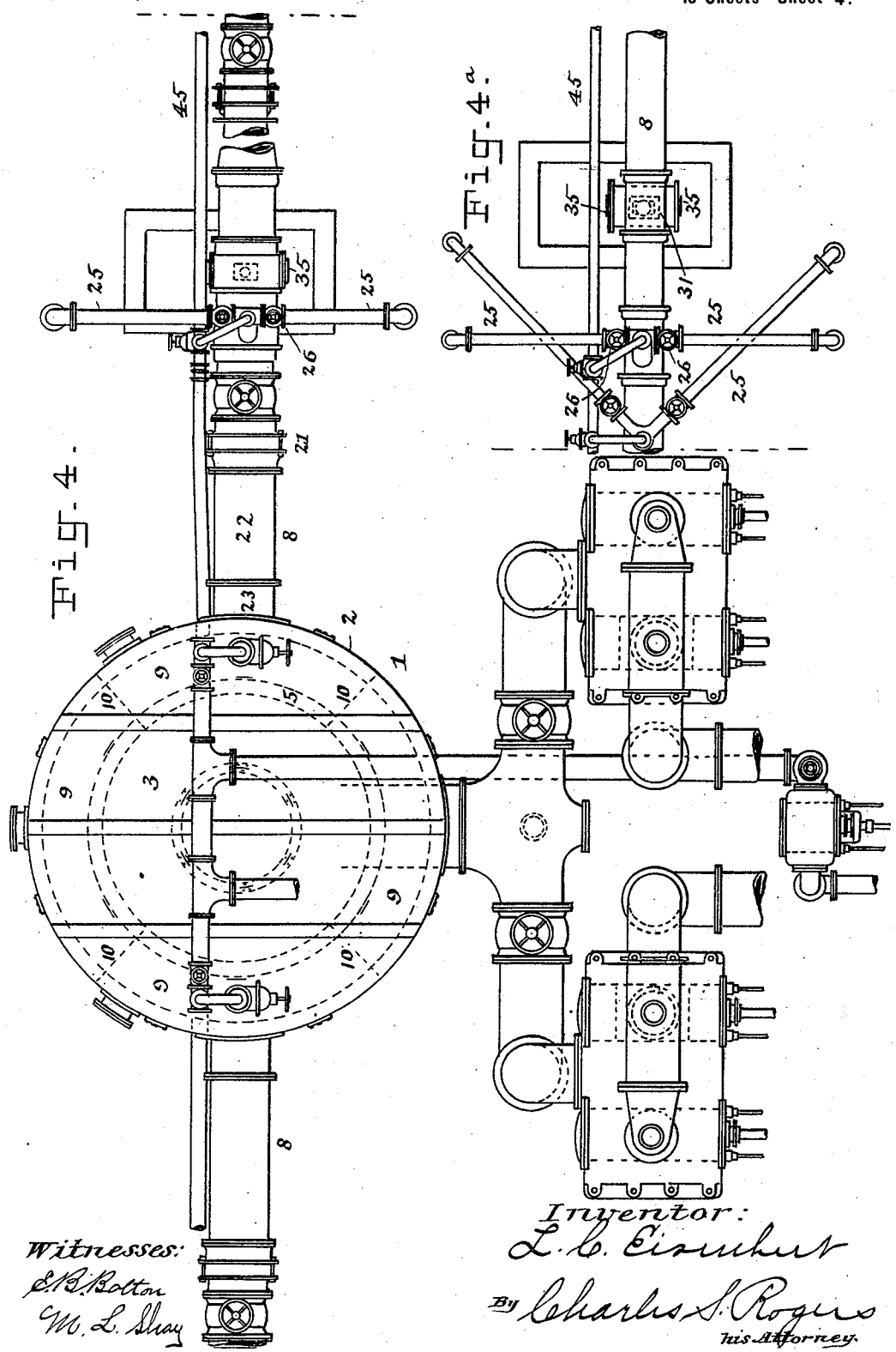
Witnesses:
Inventor:
L. C. Eisenhut
By Charles S. Rogers
his Attorney.

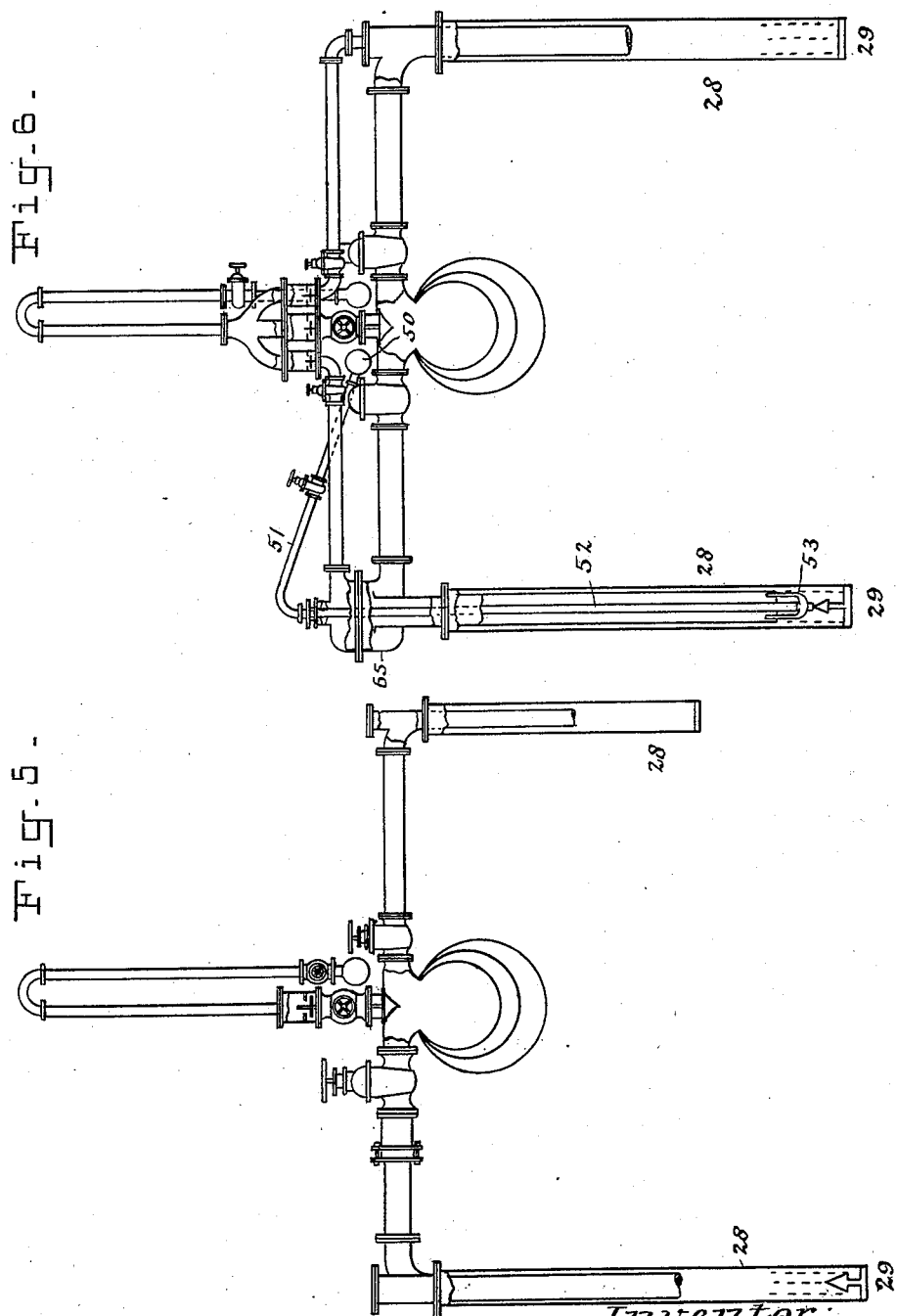

No. 665,076. Patented Jan. 1, 1901.
L. C. EISENHUT.
SYSTEM OF COLLECTING WATER FROM WELLS.
(Application filed Jan. 19, 1899.)
(No Model.) 10 Sheets—Sheet 6.
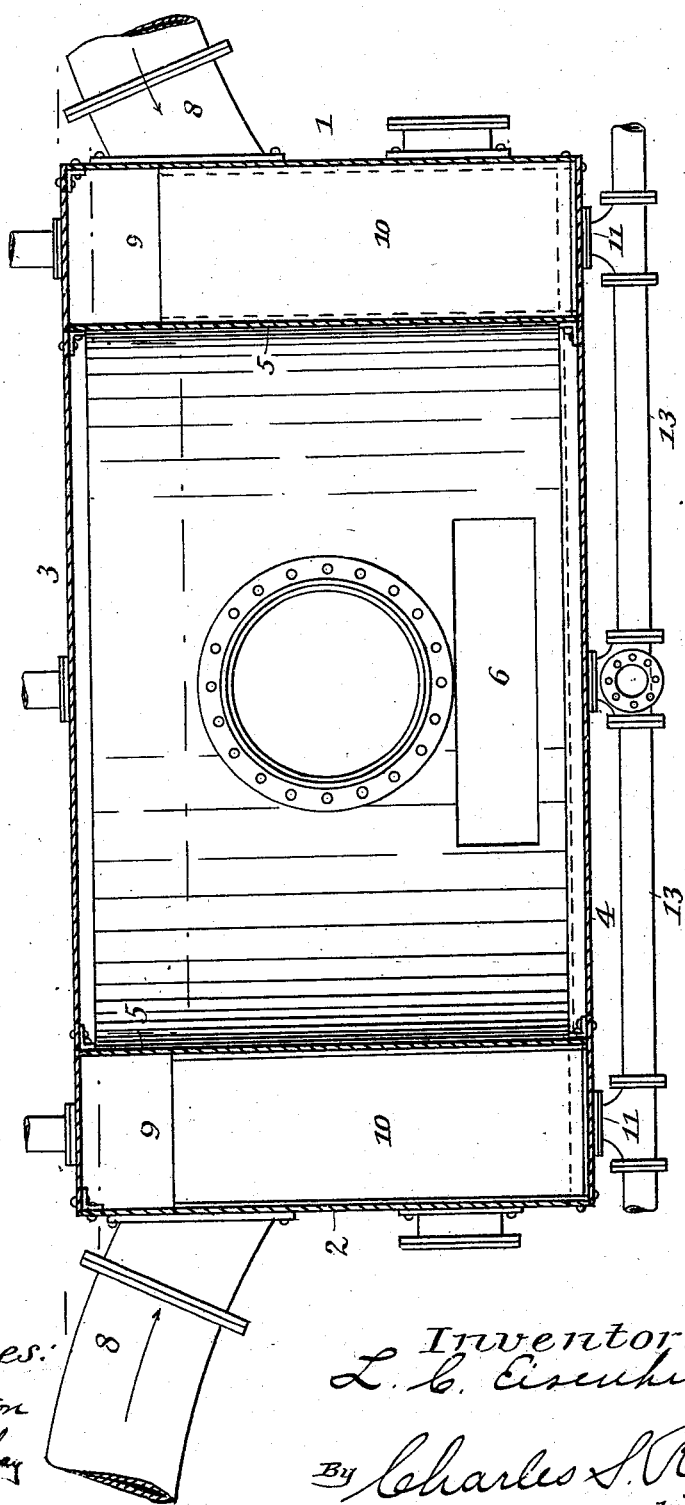

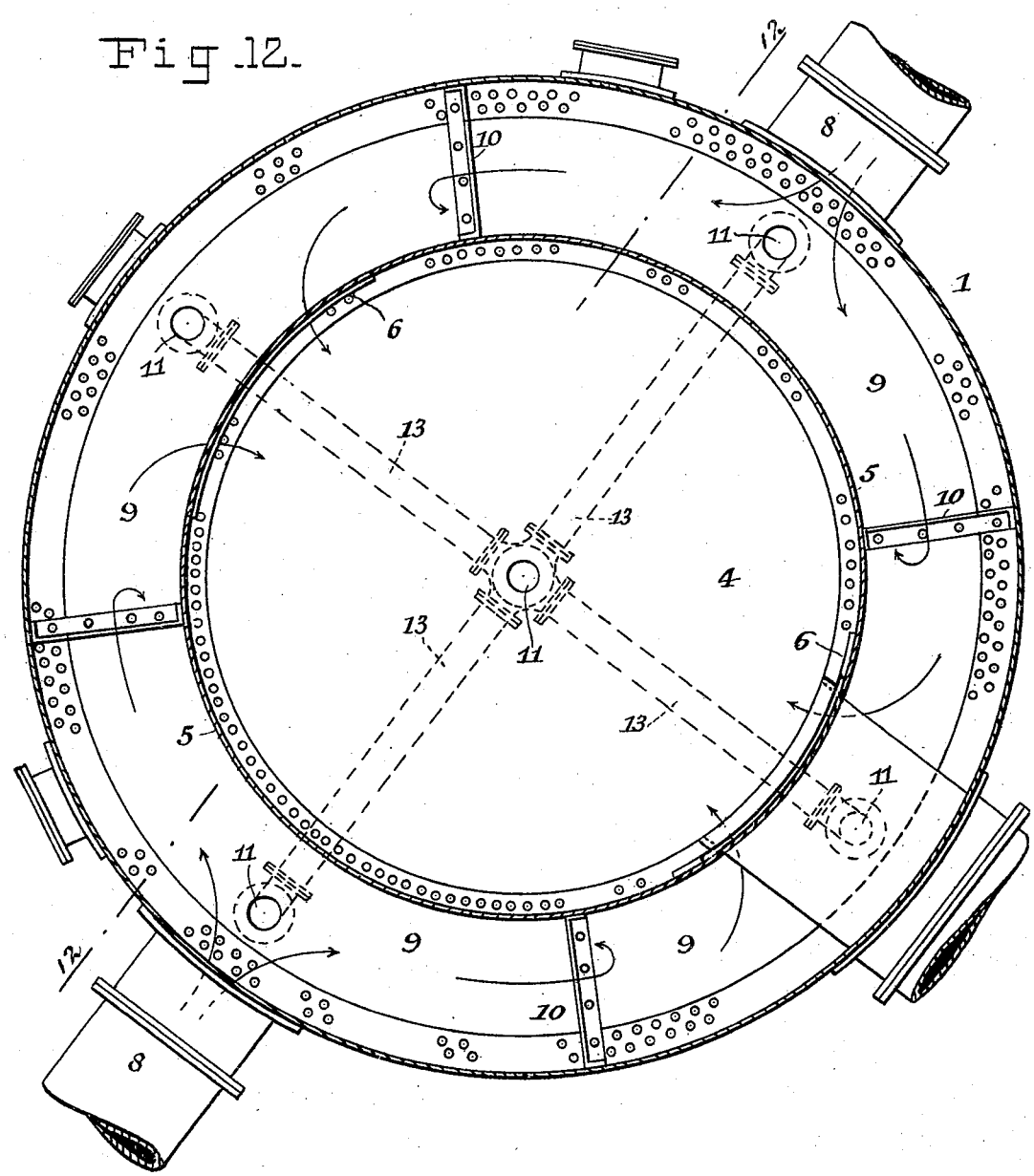

No. 665,076. Patented Jan. 1, 1901.
L. C. EISENHUT.
SYSTEM OF COLLECTING WATER FROM WELLS.
(Application filed Jan. 19, 1899.)

(No Model.) 10 Sheets—Sheet 8.

Witnesses:
E. B. Bolton
M. L. Shay

Inventor:
L. C. Eisenhut
By Charles S. Rogers
his Attorney

No. 665,076. Patented Jan. 1, 1901.
L. C. EISENHUT.
SYSTEM OF COLLECTING WATER FROM WELLS.
(Application filed Jan. 19, 1899.)
(No Model.) 10 Sheets—Sheet 9.

No. 665,076. Patented Jan. 1, 1901.
L. C. EISENHUT.
SYSTEM OF COLLECTING WATER FROM WELLS.
(Application filed Jan. 19, 1899.)
(No Model.) 10 Sheets—Sheet 10.
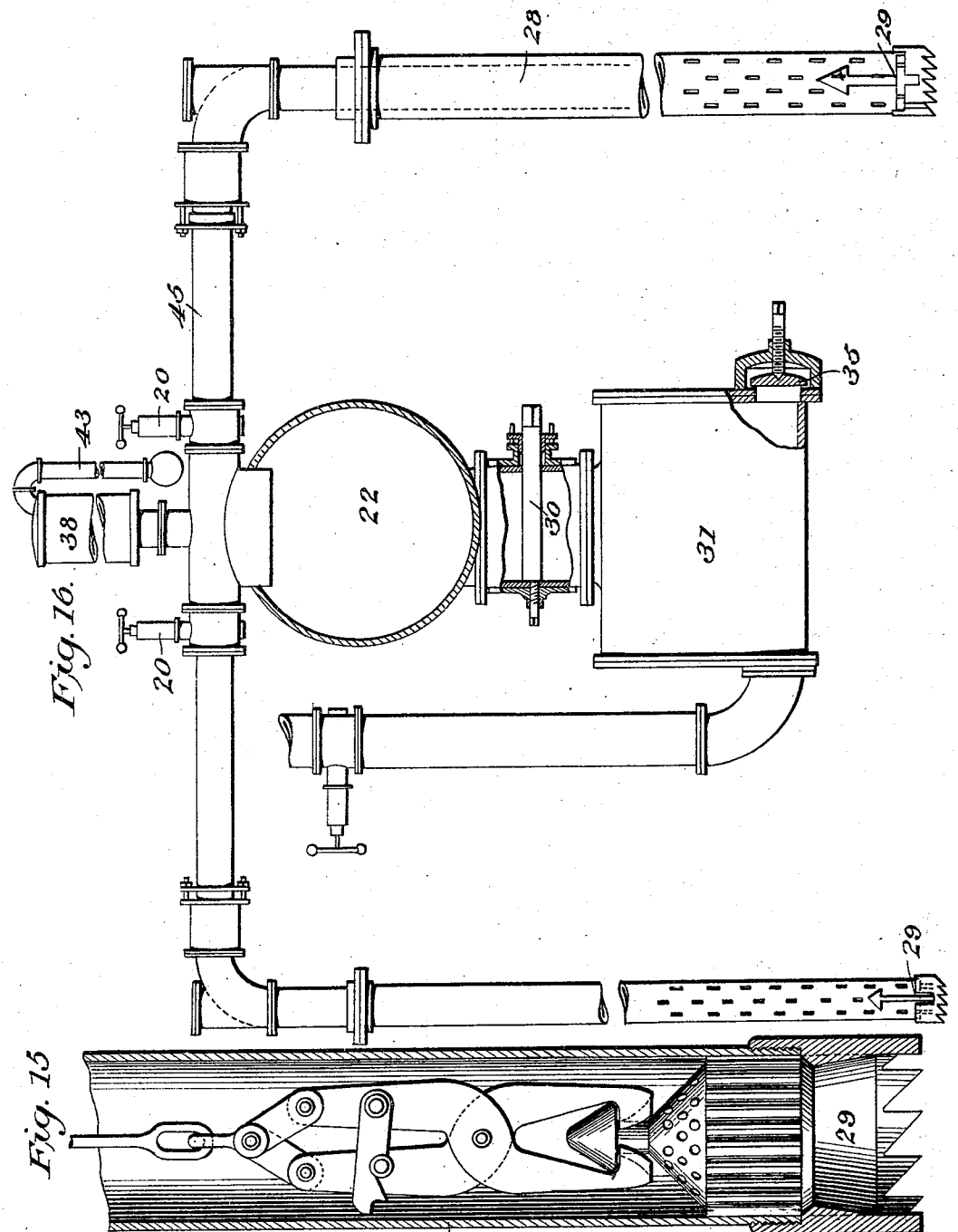

UNITED STATES PATENT OFFICE.

LAURENCE C. EISENHUT, OF NEW YORK, N. Y.

SYSTEM OF COLLECTING WATER FROM WELLS.

SPECIFICATION forming part of Letters Patent No. 665,076, dated January 1, 1901.

Application filed January 19, 1899. Serial No. 702,671. (No model.)

*To all whom it may concern:*

Be it known that I, LAURENCE C. EISENHUT, a citizen of the United States, residing in the city of New York, borough of Brooklyn, in the county of Kings and State of New York, have invented certain new and useful Improvements in Systems of Collecting Water from Wells; and I do hereby declare the following to be a full, clear, and exact description of the invention, such as will enable others skilled in the art to which it appertains to make and use the same.

This invention relates to an improved system for the coöperative collection of water from a plurality of artesian, bored, driven, or otherwise constructed wells for the purpose of water-supply from subterranean sources or for purposes of drainage of large tracts of marsh or swamp lands and conducting the water to a separator by means of mains or pipes which extend or radiate therefrom to any desired point or distance.

Some of the objects of the invention are to provide a water-supply-collective system of this general character wherein the water from the wells collected in the mains flows therein by gravity from the outer ends of the mains into the central receiver by reason of the inclination or fall of the same toward the receiver without in the least creating and exerting any back pressure or weight of the already-collected water in the mains or receiver upon the inflow of or upon the wells.

Another object of this system is to cause the flow of the accumulated issue of water from all wells in the inclined mains toward the central receiver, to create and maintain a partial vacuum in the wells, and to produce a natural, equal, and constant flow of water from the wells into the mains by siphonic action as continuous and as long as the collected water is conveyed from the central receiver to the point or points where it is desired by siphonic action and gravity, by means of suitable pumps, or in any other desired manner.

A further object is to provide the main at suitable intervals on the top part thereof with smaller branch pipes, which are in communication with the wells, and to provide the central receiver with suitable means to convey the water therefrom to any desired point or distance.

Another object of the invention is to provide a contemporaneous system of air-conducting pipes communicating with the outer chamber of the receiver and with the air-chambers located over the junction of the main and branch pipes, and to connect a vacuum-pump therewith for the purpose of withdrawing all air within the wells, branch pipes, mains, and air-chambers, and the consequent maintenance of such degrees of vacuum as may be found desirable, and to obtain and maintain a solid volume of water free from air within the inner and outer chambers of the receiver.

It is also an object of this invention to vary the diameter of the collecting-mains for the purpose of securing and maintaining a normal and equal velocity of the flow of the water therein, and this feature of construction, combined with the inclination of the connecting-mains, produces a constant and equal flow of the water from all of the wells into the receiver, whereby the wells most distant from the receiver will be equally taxed and made contributory to those wells adjacent to the receiver.

An additional object is to so construct the receiver and accumulator as to permit the entering water to remain a sufficient length of time within the same while in transit therethrough to the pumping-engine, or, in other words, to reduce the velocity of the water to a minimum while passing through the receiver to allow for the separating of the sand and earthy matter and the depositing of the same at the bottom of the receiver.

With these and other objects in view the invention consists, essentially, in the construction, combination, and arrangement of parts substantially as hereinafter more fully described in the following specification and illustrated in the accompanying drawings, in which—

Figure 1 is a side elevational view, partly in section, of the collecting-main, showing the connection of the branch pipes therewith and the well-pipes and air system. Fig. 2 is a top plan view of the same. Fig. 3 is a side elevation, partly in section, illustrating the central receiver and pumping apparatus, together with a portion of the collecting-mains, branch pipes, and air-pipes. Fig. 4 is a top plan view of the apparatus illustrated in Fig. 3. Figs.

Figure 14:
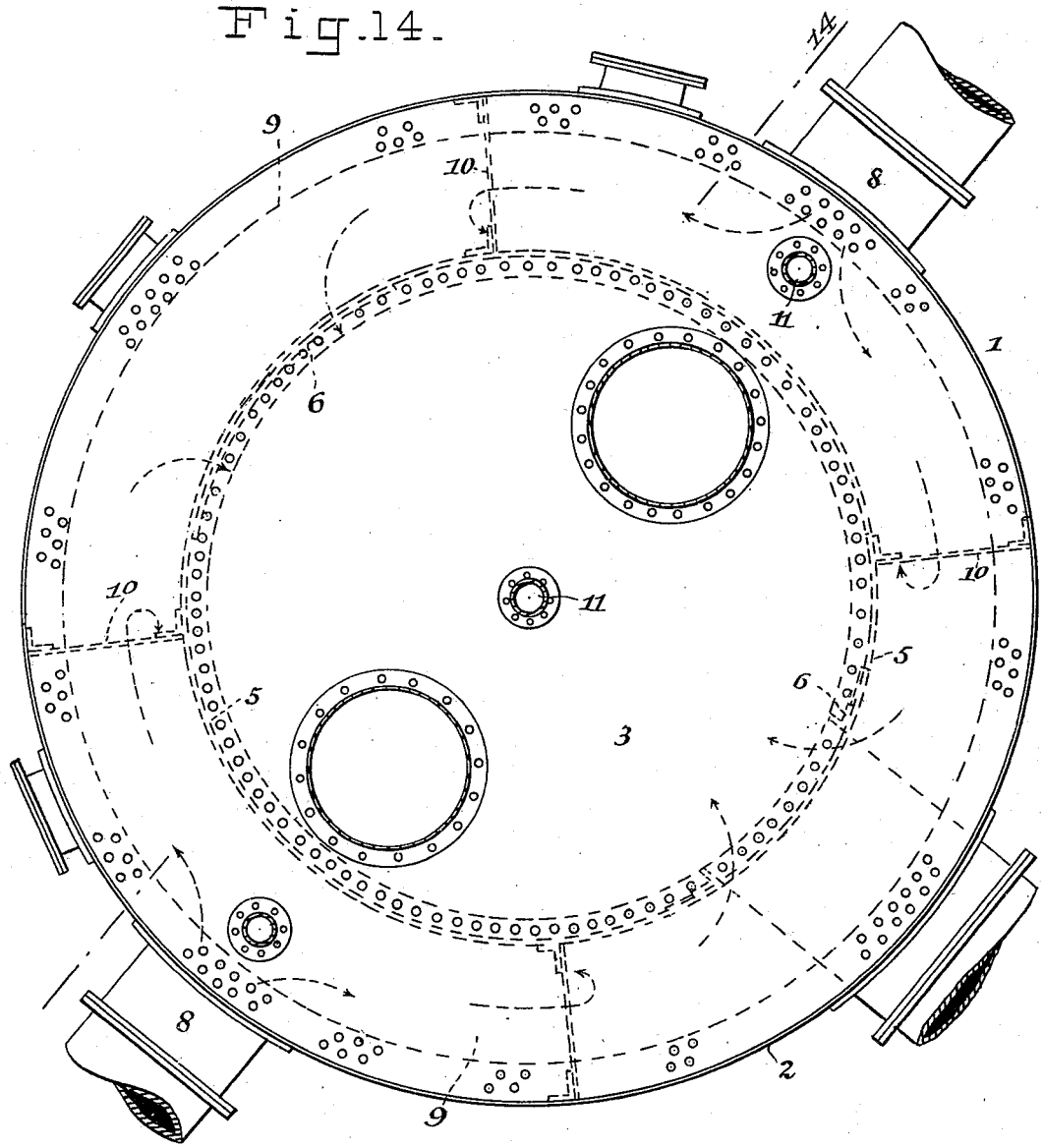

5 and 6 are detail views of a set of branch pipes and well-pipes, together with the air-pipes therefor. Fig. 7 is a view somewhat similar to Fig. 3, showing the receiver in section. Fig. 8 is a detail view of a connecting-head for one branch pipe. Figs. 9 and 10 are detail views of a modified form of connecting-head for the branch pipes. Fig. 11 is a vertical central section of the receiver, showing the mains in elevation on line 12 12 of Fig. 12. Fig. 12 is a horizontal section of the same on line 11 11, Fig. 11. Fig. 13 is a vertical central section of the receiver shown in Fig. 7 on line 14 14 of Fig. 14, and Fig. 14 is a horizontal section of the receiver shown in Fig. 13 on line 13 13 thereof. Fig. 15 is a sectional detail elevation of the lower end of the well-tubes, and Fig. 16 is an elevation of the sand-trap and connections.

Similar characters of reference designate corresponding parts throughout the several views.

Referring to the drawings, and particularly to Figs. 3, 4, and 7 thereof, the reference character 1 designates a central receiver, accumulator, and separator, which may be located at any desired point and is preferably constructed of a circular cylindrical casing 2, having a closed top 3 and bottom 4, and formed on or connected with the top 3 in an air-tight manner is an inner annular partition 5, and the partition 5 is preferably provided with openings 6 in the lower part thereof, desirably at right angles to the openings 7 in the casing 2, for the admission of the main collection-pipes 8, the size of the openings 7 being determined by the volume of water to pass therethrough or to be pumped from the inner casing by means of pumps, as hereinafter described.

The construction of the receiver is illustrated in detail in Figs. 3, 11, and 12, showing one method of connecting the top 3 and bottom 4 to the cylindrical portion 2 of the receiver, and an annular partition 5 is preferably secured by angle-irons or similar devices to the top and bottom of the receiver, thus dividing the same into an inner and outer chamber, which is preferably divided into several compartments or sections 9 by a plurality of division-plates 10, and the mains 8 are preferably connected with the outer casing 2 over suitable openings therein, so that the water flowing through the mains 8 into the outer chamber of the receiver is deflected laterally, as shown by arrows in Fig. 12, and weirs over the division-plates 10, as shown in said figure, thence passing through the openings 6 in the partitions 5 into the inner chamber, from whence it is withdrawn through the horizontal suction-pipe by the pumping-engine or other apparatus and conveyed to the locality desired.

Referring to Figs. 7, 13, and 14 of the drawings, the receiver is shown provided with vertical suction-pipes, together with the horizontal pipe shown in Figs. 3, 11, and 12, which preferably depend into the inner chamber of the receiver nearly to the level of the openings 6 in the partition 5, so that no sand or other solid matter will be conveyed through said pipes to the pumping-engine. By means of this construction of the reservoir the flow or velocity of the water passing from the collecting-mains into the receiver is obstructed or retarded by the partition 5, which deflects the water against the division-plates 10, where it is again impeded and is caused to weir over said plates into the inner chamber, from whence the water is withdrawn free from solid matter, as will be readily understood.

By means of the annular partition 5, extending concentric with and at a predetermined distance from the casing 2, the receiver is divided longitudinally into an outer and inner chamber, and the former is divided into several compartments or sections 9 by a plurality of longitudinal transverse division-plates 10, as shown in dotted lines in Fig. 4. Preferably there should be two division-plates 10 for each inlet of connecting-mains, one on either side thereof, extending from the bottom of the outer chamber upwardly substantially to a line above the lower line of the inlet-main and also extending across from the casing 2 to the partition 5, to which the plates 10 are securely attached, the function of the plates being to form an additional compartment or section directly under and of full width of the inlet of the collecting-mains, so that whatever sand or earthy matter is yet carried by the water may here be separated and be deposited at the bottom of these compartments and be prevented from entering the inner chamber and the pumping-engine. The bottom of the inner chamber and that of the compartments or sections is preferably provided with suitable outlets 11, Figs. 3 and 7, with which are connected specially-prepared three-way cut-off valves 12, suitably connected by pipes 13 for the purpose of facilitating the removal from the bottom of the inner chamber and compartments or sections, singly or collectively, of all sand, earthy, or other matter carried in and deposited by the water in the various parts of the receiver and also for cleaning out the sediment accumulating in the inner chamber. I preferably employ a specially-designed sand or turbinate suction and force-pump (not shown) for the removal of such deposited matter, operated by suitable power and suitably connected with the pipe 13, and the entire apparatus may be operated without interfering with the working of the entire system.

Suitable suction-pipes 14 extend from the top downwardly into the inner chamber of the receiver to a point a determined distance below the upper line of the collecting-mains 8 to afford means for pumping the volume of water from the inner chamber. The lower open ends of these suction-pipes are preferably provided with circular convex diaphragms 15, fixed rigidly and transversely to the sides of these pipes a determined distance from the lower extremity thereof, the object being to cause the suction-inflow of water from the sides of the inner chamber above the convex diaphragms and at a determined distance from the bottom of the receiver to prevent the entrance of any sand whatever into the suction-pipes and the pumping-engine should such sand have failed to be entirely deposited in the sand-traps, &c., as before described. The collecting-mains 8 are inclined or are provided with a fall from the extremities thereof toward the receiver to produce a flow of the water therein toward the receiver by gravity, and said mains preferably increase in diameter from the extremities of the same toward the receiver to produce an equal and uniform flow of water and to afford accommodation for the increased volume of water at the receiver. The mains are provided adjacent to the receiver with cut-off or stop-gate valves 20, preferably provided with suitable expansion sleeve-couplings 21 and also with tapering or conical inlet connections 22, preferably connected with the receiver by a nozzle or collar 23, preferably formed on or directly connected with the receiver.

The cut-off valves, expansion sleeve-couplings, conical connections, and first sections of mains are preferably secured and connected to each other and to the nozzle by means of flanges, gaskets, and bolts and nuts. All other joints or connections in the mains may be of the bell-and-spigot variety.

The collecting-mains extend or radiate from the receiver, any preferred number being employed, according to the area operated upon, and these mains are preferably provided with branch pipes 25, any desired number whereof may be employed, and each branch pipe is provided adjacent to the mains with cut-off or stop valves 26, and each branch pipe is further provided adjacent to the wells with a self-adjusting sleeve-coupling. Each branch pipe is constructed to communicate with a well and is provided at its end with a bend or elbow adapted to receive a tube 28, designed to be inserted into a well, said tube being the desired length and size, and the lower portion of the tube is preferably perforated, as shown in Fig. 5, while the extremity thereof is closed by a perforated and fluted metallic plug 29, provided with a device for withdrawing the same for the examination of the well or the stratum into which the tube may be sunk.

Each of the collecting-mains is preferably provided adjacent to the receiver and at predetermined intervals in its entire length and at the lower part or bottom thereof with a suitable cut-off valve 30 and with a sand or dirt trap 31 of any desired form or construction. The sand-trap 31 is further provided, at the end and lower part thereof, with a hand-hole and cupper 35. The function of these traps is to receive any earthy matter carried with the water from the wells into the collecting-mains while the water is on its way to the receiver.

The constructions and parts above mentioned are provided for an outlet and for the removal of all earthy matter deposited in the trap by means of a sand-pump (not shown) directly connected and operated without closing the cut-off valve 30 simply by operating the valve in the pipe connecting the sand pump and trap, as a steam-power pump is designed for the operation. The hand-hole and cupper 35 are intended for the removal when examination of the deposit within the traps 31 is desired, in which case the intervening cut-off valve 30 is accordingly in order for closing communication between the collection-main and trap 31.

Directly over the points where the branch pipes 25 connect and communicate with the collecting-mains and in communication with both are placed air-chambers 38, and arranged transversely of the branch pipes and extending upwardly through the pipes 39, communicating with the air-chambers, and downwardly into the mains are placed partition or deflecting plates adapted to prevent the flow of water from one well through one branch pipe meeting direct in line and interfering with the flow from the other, the practice being to connect two branch pipes with the collecting-mains at the same point and on each side thereof.

I preferably connect the branch pipes 25 with the collecting-mains, upon the uppermost or top thereof, by means of short annular collars 41 for the express purpose to prevent any weight or back pressure upon the wells by the water already in the mains and flowing by gravity toward and into the receiver.

The air-chambers 38, placed at determined intervals in a line throughout the entire length of the collection-mains, are provided each with an outlet-connecting flange 42, upon the upper end thereof, and each air-chamber is connected by means of the side branch pipe 43 and elbow 44 from the flanged outlet 42 downwardly and to the continuous air-pipe 45 and from the outermost end of the air-chamber upon the collecting-mains and each successively and continuously by means of the air-pipe 45, which also connects with the outer chamber of the receiver at one or several distinct points upon the upper side of the same. The air-pipes 45 preferably enter or communicate with the receiver over the side inlets of the collection-mains, and the air-pipe, air-chambers, and outer chambers of the receiver are all connected to and communicate with a vacuum-pump suitably located about the receiver. The object of this air system is to withdraw all of the air within the wells, branch pipes, air-chambers, and collecting-mains, and the consequent maintenance of such degree of vacuum as may be required; also, to obtain and maintain a solid volume of water free from air within the receiver. The air-pipe 45 is also preferably provided with a cut-off valve 46 prior to connection with the receiver, and the branches 47 between the air-pipe and outer chamber of the receiver are similarly provided with valves 48 for the purpose of correctly regulating the desired results. The air-pipe 45 is connected to the vacuum-pump by means of branch pipe 49, and the vacuum-pump is provided with a suitable outlet or discharge pipe or pipes.

In Figs. 1 and 6 is illustrated a system of air-pressure for the wells which may be employed in connection with certain wells only or with all of the wells, as desired, when the water is beyond the reach of ordinary suction produced by vacuum. In this system is preferably employed an air-pressure pump 50, which forces the air through the pipe 51 into the air-pressure pipe 52, extending into the well-tube 28, as shown by the arrows in Figs. 1 and 6, and the lower extremity of the air-pressure pipe 52 is preferably provided with upturned ends 53 to liberate the air at the bottom of the well to force the water therein upward. The commingled water and air rising in the suction-pipe 54 is discharged over the outturned edges 55 thereof approximately on a line with the upper surface of the branch pipe 25, and when so discharged the air is liberated from the water and withdrawn through the vacuum-pipe 56 and vacuum-valve 57 to the vacuum-pump 58 by way of the valve-controlled pipe 59. Thus the air is confined to the well and is not allowed to enter the branch pipes 25 or collecting-mains 8 and interfere with or retard the operation of the system, as the air may be at the same time withdrawn from the mains 8 and branch pipes 25 through the collecting-heads 60, having valve-controlled connection 61 with the vacuum-valve 62, connected by the pipe 59 with the vacuum-pump 58, as shown in Fig. 1 of the drawings. The air may be at the same time exhausted from the well-pipe 28 through the vacuum-pipe 63, also connected with the vacuum-valve 64, communicating through the pipe 59 with the vacuum-pumps 58, as before described. Thus it will be seen that the air may be withdrawn separately or collectively from the collecting-mains 8 and branch pipes 25 through the valve-controlled connection 61, vacuum-valve 62, and pipe 59 to the vacuum-pump 58, or air may be withdrawn independently or contemporaneously from the well and well-tube 28 through the vacuum-pipe 63, vacuum-valve 64, pipe 59, and vacuum-pump 58, or the air may be forced into the well by the pressure-pump 50 through the pressure-pipe 51 and withdrawn from the collecting-head 65 through the vacuum-pipe 56, vacuum-valve 57, pipe 59, and vacuum-pump 58.

Any of the independent air systems just described may be cut off by means of the cut-offs or valves 66, 67, and 68, and when in use the vacuum-valves 57, 62, and 64 automatically regulate the amount of pressure of the degree of vacuum employed, the construction of said vacuum-valves being the subject of another application.

In Figs. 9 and 10 are illustrated modified forms of collecting-heads, and in the former the head is constructed in two parts 70 and 71, held together by means of bolts or screws passing through annular flanges or rims formed thereon, and the part 71 is provided with a suction-pipe having a discharge portion 72, and the air-pressure pipe 73 preferably passes through a stuffing-box or gland 74, and suitably mounted upon the pipe 73 is a concave diaphragm 75, preferably provided with peripheral orifices or notches and a plurality of central orifices (not shown) for the egress of air and the discharge of any water that may rise above the diaphragm. The construction shown in Fig. 10 is similar to that in Fig. 9 except that the collecting-head 78 has a lateral orifice 79 for the air-pressure tube, and the diaphragm 80 is adjustably mounted upon a screw-threaded bolt or rod 81.

Where only one branch pipe is connected to the collecting-mains, it may be found desirable to employ an elbow connection 82, having a flange to afford connection with the main and provided with an inlet 83 and discharge-orifice 84 and with an orifice 85 for the air-pipe, also with a segmental deflecting rib or plate 86 to direct the water away from the orifice 84, as will be understood.

By reason of the inclination and varied diameter of the collecting-mains, as before stated, the supply-wells may be arranged within any desirable area of a suitable water-shed or water-bearing soil or stratum and may be of any number for the desired volume of water and not confined within the limited reach of direct-suction pumps and yet be operated at the lowest cost and with the best results for water-supply or drainage purposes.

It may readily be ascertained from the drawings that the entire apparatus is designed and constructed with the object of producing a most harmonious and coöperative action of the various functions of the whole system—such as the collective, conductive, separative, and accumulative devices—the attachment of the collective well branch pipes 25 upon the uppermost part of conduit-mains 8 preventing all back pressure upon the wells, the varied diameter and inclination of mains 8 toward receiver causing a natural equal gravity flow of the water and assisting in maintaining a desired vacuum. The sand-traps are at intervals attached to the lower side of mains, intercepting all sand and earthy matter causing roughness in pipes and producing undue friction, thus avoiding same, the placing of the air-chambers upon the well inlet branches upon the main collective and conduct pipes, the communication of all air-chambers and wells with the vacuum-pump and the resultant equal flow of all wells into mains, the further communication of this airpipe and vacuum-pump with the outer chamber of receiver thus removing all inflowing air from central or inner chamber of receiver, producing a solid and steady supply of water to delivery pumping-engines, the design of the receiver to cause and produce a separation of sand and earthy matter from the inflowing water while passing through the same and the facility for removing all deposits from bottom of receiver without interfering with the work of the system. It will further be observed that the receiver and accumulator are placed below the line of inflow from wells into main pipes and even below the upper side of mains, the object being, as already stated, to produce a uniform gravity flow in mains, insure a more solid body of flow, and, above all, to prevent any back pressure upon the wells by the weight of the water already delivered from wells into mains and receiver.

In the operation of this system the air is first extracted from receiver, from the mains and branch pipes 25, and air-chambers 38, thus producing a vacuum throughout the parts of the apparatus, while the atmospheric pressure without will cause the water to rise within the wells, from which it will be conducted, through side branches 25, into main pipes 8 and thence into receiver, or it may be set in operation by forcing the entire apparatus full of water through either of the mains or the receiver. By then starting and operating the vacuum-pump and maintaining a constant vacuum within the air-chambers upon the main-line pipes and within the receiver a natural flow from the wells into mains and thence into receiver will result. The water may then be conveyed from the receiver by siphonic action or by pumping-engines to the point where it is desired, and the joint volume of all the wells emptying into the mains and flowing by gravity toward receiver will aid in producing and maintaining a constant vacuum between the wells and the mains, and the wells are caused to flow into mains as long and continuous as the water is pumped or siphoned from receiver, and the process becomes semi-automatic, and this constitutes one of the chief features of this invention, as by this means the coöperative plurality-well system may be extended over an area of from five hundred to five—even ten—thousand feet radius from receiver without impairing its economic features.

This apparatus may also be employed for collecting oil or other fluids as well as water, and my invention is not limited to the exact form, construction, and arrangement of the various parts of the apparatus herein described, as it is evident that changes therein and modifications thereof may be made without departing from the spirit of my invention or sacrificing its advantages, and I reserve the right to make all such alterations therein and modifications thereof as fairly come within the scope of my invention.

Having described my invention, what I claim as new, and desire to secure by Letters Patent, is—

1. A receiver having a partition connected therewith by division-plates and inlet-mains connected with said receiver between said division-plates so as to discharge the liquid directly against said partition to retard the flow or velocity thereof and produce sedimentation of the solid matter in said liquid within the compartments so formed.

2. A water system provided with a receiver having inlet and discharge openings, a partition having openings in vertical alinement with the discharge-opening but out of horizontal alinement therewith and means connected with said receiver in communication with said inlet and discharge openings for introducing and withdrawing the liquid.

3. A water system provided with a receiver having inlet and discharge openings, a partition having openings below said discharge-openings for the admission of the liquid therethrough and means connected with said receiver for introducing liquid thereinto and separate means connected with said receiver and extending within said partition for withdrawing the liquid therefrom.

4. A water system provided with a receiver having inlet-openings, a partition having inlet-passages and a discharge-opening, means connected with the receiver around said inlet-opening for the introduction of the liquid and means connected with said discharge-opening in said partition for withdrawing the liquid.

5. A water system provided with a receiver, an annular partition therein having openings, a plurality of division-plates between said partition and receiver and means connected with said receiver for introducing the liquid directly against said partition to be deflected against said division-plates.

6. A water system provided with a receiver, a continuous partition having openings and dividing said receiver into an inner and outer compartment and means for withdrawing the liquid that has passed into the inner compartment through said openings from above the level thereof.

7. A water system provided with a receiver having compartments, means for introducing liquid into said receiver to be directly deflected against the adjacent walls of said compartments to produce sedimentation and a device connected with each of said compartments and with a pump or other apparatus to remove the solid material deposited in said compartments singly or collectively.

8. A receiver having compartments, means for introducing the liquid into the outer compartment and retarding the flow thereof to produce sedimentation, means for withdrawing the air from the receiver and means for withdrawing the purified liquid from the inner compartment of the receiver.

9. A receiver having openings for the introduction of the liquid and depending pipes having convex diaphragms to withdraw only the liquid from said receiver.

10. A receiver provided with an annular partition, and transverse division-plates said receiver having inlet-openings constructed to discharge the liquid directly against said partition to be deflected against said plates, and said partition being provided with passages for the liquid, a valve-controlled device below said receiver for the removal of solid matter and pipes for withdrawing the liquid above said receiver.

11. A water system provided with collecting-mains, branch pipes connected therewith, well-tubes and self-adjusting connection between the pipes and tubes.

12. A water system provided with mains, cut-off valves connected therewith about the bottom thereof, said traps controlled by said valves and mains for withdrawing the material from said traps without interrupting the flow of liquid in said mains.

13. A water system provided with mains having nozzles upon the top thereof, a receiver wherewith said mains are connected, branch pipes connected with said nozzles, air-chambers communicating with said nozzles, air-pipes connected with said receiver and air-chambers and with the vacuum-pump, whereby the air is simultaneously withdrawn from the entire apparatus.

14. A water system provided with a receiver having an annular partition with openings, means for withdrawing solid matter therefrom, mains communicating with said receiver, branch pipes communicating with wells and with said mains, air-chambers at the junction of the mains and branch pipes and means for withdrawing air from the apparatus to start the flow of water.

15. A water system provided with a receiver, collecting-mains communicating therewith provided with branch and well pipes and separate means communicating with each of the latter for raising the liquid in the wells when the same is beyond the force of a vacuum, but separating the air from the liquid in the mains.

16. A water system provided with well-tubes communicating with the receiver and separate means within said well-tubes constructed to force the liquid therein into the receiver communications and to withdraw the propelling agent employed before it enters said communications.

17. A water system provided with well-tubes communicating with a receiver, independent devices within said well-tubes constructed for forcing a propelling agent into said well-tubes to raise the liquid therein into the receiver connections and to withdraw the propelling agent before entering said connections.

18. A water system provided with well-tubes having discharge connections, devices within said tubes to receive air, connections between the latter and a pressure apparatus and connections between said devices and an exhaust apparatus, whereby air is forced into said devices to raise the liquid in the well-tubes and the air is withdrawn from said discharge connections.

19. A receiver provided with an annular partition connected with the receiver by radial division-plates extending nearly to the top of the receiver, the latter having inlet-openings constructed to discharge liquid directly against said partition to be deflected laterally against said plates to separate the solid material and permit the purified liquid to weir over said plates.

20. A receiver provided with an annular partition connected with the receiver by radial division-plates extending nearly to the top of the receiver, the latter having inlet-openings constructed to discharge liquid directly against said partition to be deflected laterally against said plates to separate the solid matter and permit the purified liquid to weir over said plates, and means for withdrawing the solid matter from the bottom of said compartments.

21. A water system provided with a receiver having inlet-nozzles, conical pipes connected at the larger end thereof to said nozzles, expansion-sleeve couplings connected with the smaller end of said conical pipes and collecting-mains attached to said couplings whereby an equal velocity of the liquid is secured.

22. A water system provided with mains, branch pipes connected therewith, well-tubes attached to said pipes having perforated free ends and perforated plugs in said free ends, constructed to be withdrawn for examination of the wall or stratum wherein the tubes are sunk.

23. A water system provided with collecting-mains, sand-traps, connections between said traps and the bottoms of said mains, valves or gates in said connections and means for withdrawing the solid matter from said traps without interrupting the flow of liquid in said mains.

24. A water system provided with collecting-mains, sand-traps having hand-holes or cuppers to afford access to the contents thereof, valved connections between said mains and traps and means for withdrawing the contents of said traps without stopping the flow of liquid in said mains.

25. A water system provided with collecting-mains, sand-traps having hand-holes, valved connections between said mains and traps and valved connections between said traps and withdrawing apparatus.

26. A water system provided with a receiver, collecting-mains communicating therewith, air-chambers upon said mains, a main air-pipe connected with an exhaust apparatus and connections between said air-pipe and said receiver, and air-chambers, whereby the air can be withdrawn from the entire apparatus simultaneously to start and help maintain the flow of liquid.

27. A water system provided with a receiver having inlet-openings, mains connected with said receiver around said openings, a partition extending from the top to the bottom of said receiver having openings therein, partition-plates between said receiver and partition and suction-pipes within said partition.

28. A water system provided with a receiver having an annular partition extending from the top to the bottom thereof and connected therewith by radial division-plates, mains attached to said receiver and discharging directly into the compartments formed by said partition and division-plates, branch pipes communicating with said mains and well-tubes connected with said pipes.

29. A water system provided with a receiver having an annular partition connected therewith by radial division-plates, mains connected with said receiver, branch pipes communicating with said mains, well-tubes connected with said pipes, air-chambers above the connection of said pipes with said mains and an air-pipe connected with said receiver, the chambers and exhausting apparatus.

30. A water system provided with a receiver having a partition connected therewith by division-plates, mains connected with said receiver, branch pipes communicating with said mains, well-tubes connected with said pipes having perforated ends closed by a removable plug, air-chambers communicating with said mains and pipes, connections between said chambers and receiver and a vacuum-pump and means for withdrawing the purified fluid from said receiver.

In witness whereof I have affixed my signature in the presence of two witnesses.

L. C. EISENHUT.

Witnesses:
CHARLES S. ROGERS,
M. L. SHAY.